US010909688B2

(12) United States Patent
Hayashi et al.

(10) Patent No.: US 10,909,688 B2
(45) Date of Patent: Feb. 2, 2021

(54) MOVING BODY TRACKING DEVICE, MOVING BODY TRACKING METHOD, AND MOVING BODY TRACKING PROGRAM

(71) Applicant: Qoncept, Inc., Tokyo (JP)

(72) Inventors: Kenichi Hayashi, Tokyo (JP); Shunsuke Nambu, Tokyo (JP)

(73) Assignee: Qoncept, Inc., Tokyo (JP)

( * ) Notice: Subject to any disclaimer, the term of this patent is extended or adjusted under 35 U.S.C. 154(b) by 151 days.

(21) Appl. No.: 16/146,222

(22) Filed: Sep. 28, 2018

(65) Prior Publication Data

US 2019/0122370 A1    Apr. 25, 2019

(30) Foreign Application Priority Data

Sep. 29, 2017 (JP) ................................. 2017-189397

(51) Int. Cl.
| | |
|---|---|
| *G06K 9/00* | (2006.01) |
| *G06T 7/20* | (2017.01) |
| *G06T 7/70* | (2017.01) |
| *G06T 7/246* | (2017.01) |
| *G06T 7/277* | (2017.01) |

(52) U.S. Cl.
CPC .............. *G06T 7/20* (2013.01); *G06T 7/251* (2017.01); *G06T 7/277* (2017.01); *G06T 7/70* (2017.01); *G06T 2207/10016* (2013.01); *G06T 2207/10024* (2013.01); *G06T 2207/20076* (2013.01); *G06T 2207/30224* (2013.01)

(58) Field of Classification Search
None
See application file for complete search history.

(56) References Cited

U.S. PATENT DOCUMENTS

| | | | |
|---|---|---|---|
| 2006/0222205 A1 | 10/2006 | Porikli et al. | |
| 2010/0266159 A1 | 10/2010 | Ueki et al. | |
| 2012/0039507 A1* | 2/2012 | Ikenoue | ............. G06K 9/00362 382/103 |
| 2012/0243733 A1 | 9/2012 | Sawai | |
| 2013/0050502 A1* | 2/2013 | Saito | ......................... G06T 7/20 348/169 |
| 2016/0042544 A1* | 2/2016 | Moesle | ..................... G06T 5/50 345/629 |
| 2017/0124388 A1 | 7/2017 | Ueda | |

FOREIGN PATENT DOCUMENTS

JP         2008250999         10/2008

* cited by examiner

*Primary Examiner* — Wei Wen Yang
(74) *Attorney, Agent, or Firm* — Trojan Law Offices

(57) ABSTRACT

In a moving body tracking using image data, while the moving body of a target has few outstanding features in appearance and a plurality of images similar to that of the target moving body exist in image frames, the moving body is tracked with high accuracy by evaluating a motion model (for example, a motion of a ball follows the law of motion and the ball is likely located above the table-tennis table) in a given environment (for example, table-tennis) from image data.

15 Claims, 10 Drawing Sheets

Fig. 11

| | Likelihood score : Lmn(t) Large ←――――――――――――――――――――→ Small | | | | | | |
|---|---|---|---|---|---|---|---|
| Q1(t) | Lx1(t)1 | Lx1(t)2 | Lx1(t)3 | Lx1(t)4 | Lx1(t)5 | ... | Lx1(t)m |
| Q2(t) | Lx2(t)1 | Lx2(t)2 | Lx2(t)3 | Lx2(t)4 | Lx2(t)5 | ... | Lx2(t)m |
| Q3(t) | Lx3(t)1 | Lx3(t)2 | Lx3(t)3 | Lx3(t)4 | Lx3(t)5 | ... | Lx3(t)m |
| Q4(t) | Lx4(t)1 | Lx4(t)2 | Lx4(t)3 | Lx4(t)4 | Lx4(t)5 | | Lx4(t)m |
| ⋮ | ⋮ | ⋮ | ⋮ | ⋮ | ⋮ | | ⋮ |
| Qn(t) | Lxn(t)1 | Lxn(t)2 | Lxn(t)3 | Lxn(t)4 | Lxn(t)5 | ... | Lxn(t)m |

MOVING BODY TRACKING DEVICE, MOVING BODY TRACKING METHOD, AND MOVING BODY TRACKING PROGRAM

CROSS REFERENCE TO RELATED APPLICATIONS

This application is based upon and claims the benefits of priorities from Japanese Patent Application No. 2017-189397 filed on Sep. 29, 2017, the entire content of which is incorporated herein by reference.

TECHNICAL FIELD

The disclosure relates to a moving body tracking device, a moving body tracking method, and a moving body tracking program.

RELATED ART

Recently, advances in the technology for taking a moving image facilitate taking of an image (especially, the moving image) in everyday various situations. In view of this, a device that tracks a movement of an object from taken images (especially, a moving image) with the image analysis technology has been so demanded that such a device has been invented. As the conventionally known invention in which the moving body is tracked using the images, for example, WO2012/127618 describes a device that detects and tracks a moving body by evaluating the degree of movement degree of a color.

WO2016/021143 describes a device that tracks a moving body by detecting the movement amount of pixel between frame images and by superimposing images indicating the positions of the pixel having the maximum movement amount to detect a trajectory of the moving body.

SUMMARY OF THE INVENTION

However, in the device described in WO2012/127618, the moving body is detected and tracked by evaluating the degree of movement of the color. Thus, it is difficult to track a moving body having few features outstanding in appearance such as a color, a shape, and a location of a part. For example, a ball for the table tennis and a ball for the golf may be difficult to be tracked without relying on the feature in appearance.

Even in the case of a moving body having features in appearance such as the color, the shape, and the location of part, for example, such as a ball for the volleyball or the soccer, it is difficult to track the moving body, which cannot be specified as the unique target object while a plurality of candidate bodies are detected.

In the device described in WO2016/021143, the moving body is tracked by detecting the trajectory of the moving body from the movement amount of the pixel between the frame images. However, for example, in the table tennis, there are many cases, in which a plurality of images of balls having features similar to that of the image of the ball to be tracked as a target object may exist in a plurality of frame images, such as balls left on the floor after having been used in practice and spare balls held by the referee and the like other than the ball in use for play. Then, it is possible that an object having a similar feature to the ball may be falsely detected as the tracking target. In such a case, it is difficult to track the moving body with high accuracy.

It is difficult to track the moving body having few features in appearance according to the moving body tracking technology using the image analysis focusing on the pixel and the feature in appearance such as the color, the shape, and the location of part as described in WO2012/127618 and WO2016/021143. In order to solve this issue, a solution is provided based on the moving body tracking technology using the image analysis with respect to a feature of a motion of a moving body.

A moving body tracking device according to an embodiment of the disclosure includes a moving body tracking device that tracks a movement of an object in a given environment using image data, including:

a position information generating unit capable of generating position information of the object as a candidate of a tracking target from the image data in an image frame;

a candidate position holding unit capable of holding the position information of a plurality of candidates of the object that is plausible as the tracking target in each of the image frames;

a position predicting unit capable of calculating prediction position information, the candidate position holding unit holding the position information of the candidates in a first image frame, in a second image frame based on a motion model determined from a coordinate system that is specific information by the given environment, a position condition that the tracking target is located, a prediction position calculation formula in the second image frame consecutively following the first image frame, a position score calculation formula based on an existence probability distribution of the tracking target, and a motion score calculation formula based on a velocity of the tracking target;

a candidate extracting unit capable of calculating likelihood scores indicating degrees of coincidence of positions for respective combinations of the position information generated by the position information generating unit from the image data in the second image frame and the prediction position information in the second image frame calculated by the position predicting unit, extracting one or two or more candidates in the second image frame based on the likelihood scores, and outputting the position information of the extracted candidates to the candidate position holding unit;

a target position specifying unit capable of specifying position information of the object as the tracking target in the image frame from the position information of the candidates extracted by the candidate extracting unit, based on an evaluation score indicating a plausibility as the tracking target obtained from a combination of a position score and a motion score calculated based on the motion model determined from the given environment; and a moving body tracking unit capable of tracking the movement of the object by tracing the position information of the object specified by the target position specifying unit in the consecutive image frames.

Here, the given environment refers to an environment where an object to be tracked is placed and specific information to be considered is involved in order to increase a prediction accuracy, in addition to the law of motion in the classical mechanics (Newtonian mechanics), when the position of the object to be tracked using the image data is predicted. The detail will be described later.

The motion model refers to a model for the motion of the object in the given environment which is utilized when the position of the object to be tracked using the image data is predicted. The motion model may be determined from the law of motion in the classical mechanics (Newtonian mechanics), and additionally, the coordinate system that is the specific information of the given environment, the position condition that the tracking target is located, the prediction position calculation formula in the second image frame consecutively following the first image frame, the position score calculation formula based on the existence probability distribution of the tracking target, and the motion score calculation formula based on the velocity of the tracking target. The detail will be described later.

In the moving body tracking device according to an embodiment of the disclosure, the candidate extracting unit is configured to set an upper limit of the number of the candidates of the object in the second image frame that are identical to the candidates in the first image frame used as a basis of the calculation of the prediction position information by the position predicting unit.

In the moving body tracking device according to an embodiment of the disclosure, the candidate extracting unit is configured to extract at least one candidate in the second image frame based on each of all the candidates in the first image frame.

In the moving body tracking device according to an embodiment of the disclosure, the candidate extracting unit is configured to remove the candidate in the second image frame having the likelihood score that is less than a threshold from the candidates.

A moving body tracking method according to an embodiment of the disclosure is a moving body tracking method of tracking a movement of an object in a given environment using image data, the method comprising:

a position information generating step of generating position information of an object as a candidate of a tracking target from the image data in image frames;

a candidate position holding step of holding the position information of a plurality of candidates of the object that is plausible as the tracking target for each of the image frames;

a position predicting step of, for the candidates in a first image frame for which the candidate position holding unit holds the position information, calculating prediction position information based on a motion model determined from a coordinate system that is specific information by the given environment, a position condition that the tracking target is located, a prediction position calculation formula in a second image frame consecutively following the first image frame, a position score calculation formula based on an existence probability distribution of the tracking target, and a motion score calculation formula based on a velocity of the tracking target, in the second image frame;

a candidate extracting step of calculating likelihood scores indicating degrees of coincidence of positions for respective combinations of the position information generated by the position information generating unit from the image data in the second image frame and the prediction position information in the second image frame calculated by the position predicting unit, extracting the one or two or more candidates in the second image frame based on the likelihood scores, and outputting the position information of the extracted candidates to the candidate position holding unit;

a target position specifying step of specifying position information of the object as the tracking target in the image frame from the position information of the candidate extracted by the candidate extracting unit, based on an evaluation score indicating a plausibility as the tracking target obtained from a combination of a position score and a motion score calculated based on the motion model determined from the given environment; and a moving body tracking step of tracking the movement of the object by tracing the position information of the object specified by the target position specifying unit in the consecutive image frames.

A moving body tracking program according to an embodiment of the disclosure is a moving body tracking program that causes a computer to function to track a movement of an object in a given environment using image data, the moving body tracking program causing the computer to function:

as a position information generating unit capable of generating position information of an object as a candidate of a tracking target from the image data in image frames;

as a candidate position holding unit capable of holding the position information of a plurality of candidates of the object that is plausible as the tracking target for each of the image frames;

as a position predicting unit capable of calculating prediction position information, for the candidates in a first image frame for which the candidate position holding unit holds the position information, based on a motion model determined from a coordinate system that is specific information by the given environment, a position condition that the tracking target is located, a prediction position calculation formula in a second image frame consecutively following the first image frame, a position score calculation formula based on an existence probability distribution of the tracking target, and a motion score calculation formula based on a velocity of the tracking target, in the second image frame;

as a candidate extracting unit capable of calculating likelihood scores indicating degrees of coincidence of positions for respective combinations of the position information generated by the position information generating unit from the image data in the second image frame and the prediction position information in the second image frame calculated by the position predicting unit, extracting one or two or more candidates in the second image frame based on the likelihood scores, and outputting the position information of the extracted candidate to the candidate position holding unit;

as a target position specifying unit capable of specifying position information of the object as the tracking target in the image frame from the position information of the candidate extracted by the candidate extracting unit, based on an evaluation score indicating a plausibility as the tracking target obtained from a combination of a position score and a motion score calculated based on the motion model determined from the given environment; and as a moving body tracking unit capable of tracking the movement of the object by tracing the position information of the object specified by the target position specifying unit in the consecutive image frames.

Based on the moving body tracking technology by the image analysis focusing on the feature in the motion of the moving body, the issue in the moving body tracking technology by the conventional image analysis focusing on the feature and the pixels in appearance such as the color, the shape, and the location of parts may be solved. This may ensure the tracking with high accuracy of the moving body having few appearance features such as the ball in the ball game whose tracking is difficult by the moving body tracking technology by the conventional image analysis.

As described above, since the image (especially, the moving image) can be easily taken in the everyday various situations, the device that tracks the movement of the object from the taken image (especially, the moving image) with the image analysis technology is required. Thus, it is important to understand the relative position, the movement (the velocity and its direction), and the like in the given environment, taking a certain object as the tracking target, from the image (especially, the moving image) captured by the camera or the like. For example, the position and the movement of the ball in the ball game may determine to either win or lose the game, and especially, it is desired to make the relationship with environment information such as the boundary line clear. Recording the velocity and the trajectory of the ball is effective for training of the player.

Furthermore, focusing on the feature of the motion of the moving body in the given environment, not the appearance feature of the tracking target, ensures the tracking with high accuracy of the tracking target even with the use of the image quality such as the number of pixels, the number of frames per unit time, and the like by performance of the general-purpose camera or the like (for example, the number of frames per unit time is about 60 fps). In view of this, it is not necessary to use a sophisticated and high-quality camera, a special camera, and the like.

BRIEF DESCRIPTION OF THE DRAWINGS

FIG. 11 is a diagram schematically illustrating the candidate extracting process with the likelihood score executed by the candidate extracting unit according to Embodiment 3.

DETAILED DESCRIPTION OF EMBODIMENTS

Figure 1:
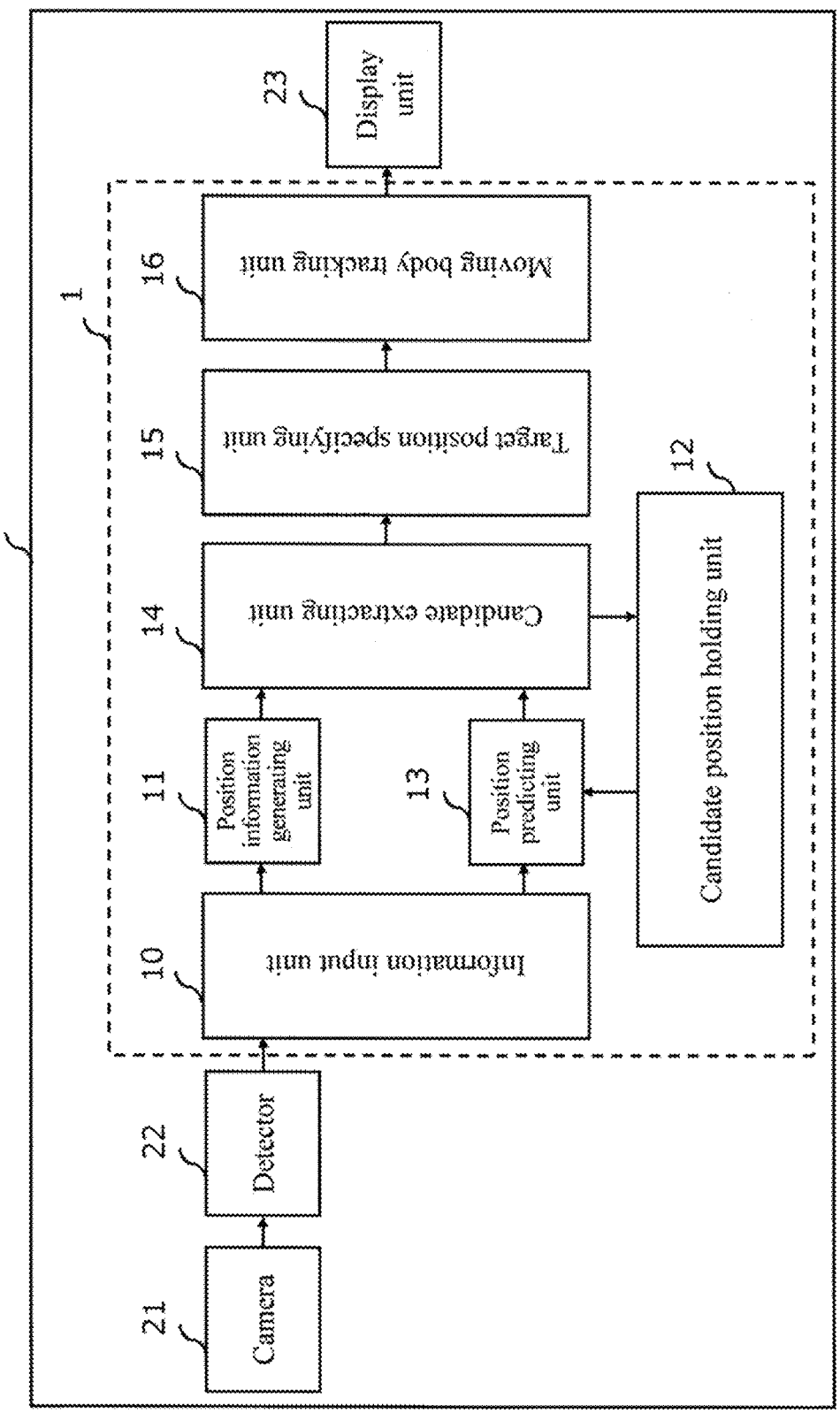
FIG. 1 is a block diagram of a device including a moving body tracking device.

A description will be given of embodiments of the disclosure with reference to the drawings. The overlapping description may be omitted, and like reference numerals designate identical or equivalent elements in the respective drawings.

Embodiment 1

A moving body tracking device according to this embodiment is a device that tracks a moving body using an image. The moving body tracking device according to this embodiment is suitably employed for a device that tracks a moving body having few features outstanding in appearance such as a color, a shape, and a location of parts that moves in accordance with the law of motion in a predetermined field, such as tracking the movement of a ball in the ball game or the like such as the table tennis, the golf, the baseball, and the volleyball, with high accuracy. This is an example, and the application is not limited to only the athletic competition.

Figure 2:
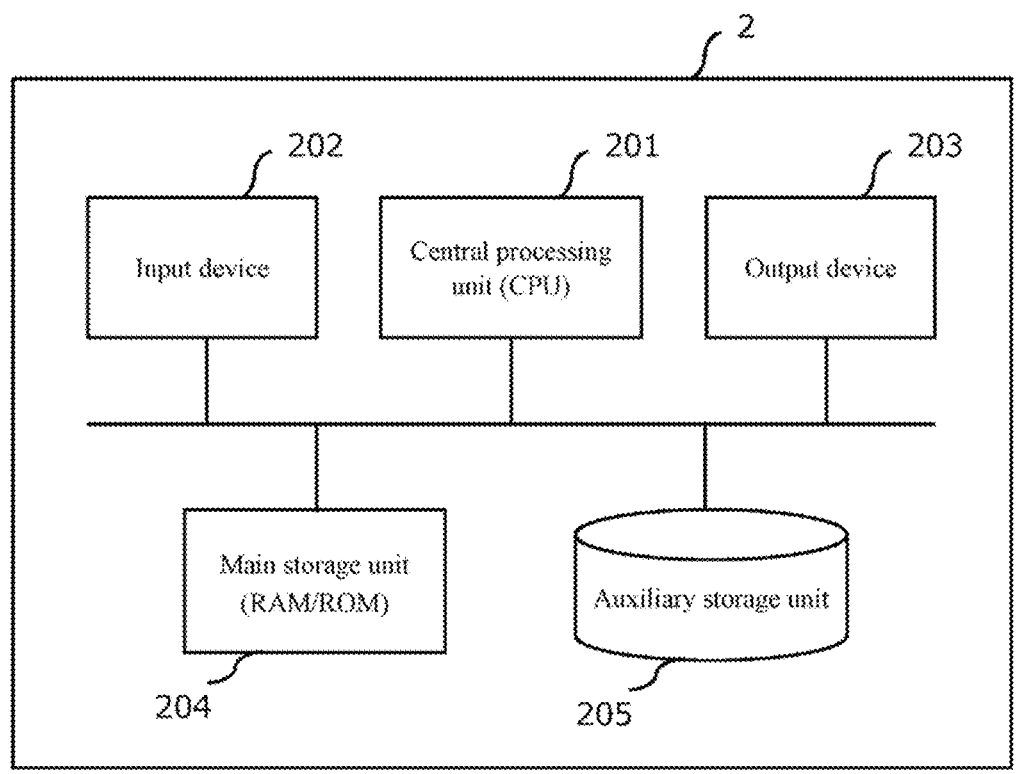
FIG. 2 is a hardware configuration diagram of the device illustrated in FIG. 1.

FIG. 1 shows a block diagram of a device 2 including a moving body tracking device 1. The device 2 illustrated in FIG. 1, which may include an electric appliance such as a smart phone, a personal digital assistant, a digital camera, a game terminal, and a television, has a hardware configuration as illustrated in FIG. 2. As illustrated in FIG. 2, the device 2 is physically configured as a computer system including a central processing unit (CPU) 201, an input device 202, an output device 203, a main storage unit (RAM/ROM) 204, an auxiliary storage unit 205, and the like. The device 2 is specifically configured of a camera, a touch screen, a keyboard, and the like, as the input device 202, and a display, a printer, and the like, as the output device 203. The device 2 may has a configuration including a communication module and the like to be connected to a network. The moving body tracking device 1 may be configured as the computer system including the central processing unit (CPU) 201, the input device 202, the output device 203, the main storage unit (RAM/ROM) 204, the auxiliary storage unit 205, and the like.

Respective functions of the moving body tracking device 1 and the device 2 are achieved by causing the central processing unit (CPU) 201, the main storage unit (RAM/ROM) 204, and the like as illustrated in FIG. 2 to read a predetermined computer software to cause the input device 202 and the output device 203 to operate by the control of the central processing unit (CPU) 201 and by executing reading and writing of data with the main storage unit (RAM/ROM) 204 and the auxiliary storage unit 205.

As illustrated in FIG. 1, the device 2 includes a camera 21, a detector 22, the moving body tracking device 1, and a display unit 23. The moving body tracking device 1 includes an information input unit 10, a position information generating unit 11, a candidate position holding unit 12, a position predicting unit 13, a candidate extracting unit 14, a target position specifying unit 15, and a moving body tracking unit 16.

The camera 21 may include, for example, an imaging element or the like to have a function of taking images or moving images. The camera 21 may be a monocular camera or a multi-eye camera. The camera 21 has a function of outputting a plurality of images or a moving image having been taken as image frames to the detector 22.

The detector 22 has a function of detecting candidates having features that may match a feature of an object of a tracking target from image data in an image frame having been input from the camera 21. The candidates may be detected using, for example, a pattern matching method such as the Sum of Squared Difference (SSD), the Sum of Absolute Difference (SAD), and the Normalized Cross Correlation (NCC), or a statistical learning method. The detector 22 has a function of outputting information of the candidates having been detected from the image data in the image frame to the input unit 10 in the moving body tracking device 1.

The moving body tracking device 1 has a function of tracking the object of the tracking target by specifying position information of the object of the tracking target in the image frame so as to trace the object from the information of the candidates having been detected from the image data in the image frame having been input from the detector 22. The moving body tracking device 1 has a function of outputting the position information of the object of the tracking target having been specified in each frame to the display unit 23.

The information input unit 10 has a function of outputting necessary information from the information of the candidates having been detected from the image data in the image frame having been input from the detector 22, to the position information generating unit 11. The necessary information includes, at least, information for specifying the image frame (hereinafter referred to as "image frame number") and information for specifying positions of the candidates (hereinafter referred to as "position information"). The information input unit 10 has a function of outputting the image frame number to the position predicting unit 13. The information input unit 10 may have a function of outputting the necessary information to the position information generating unit 11 by extracting the image frames at a predetermined interval (hereinafter referred to as "frame extraction").

The position information generating unit 11 has a function of generating the position information of respective candidates from the information of the candidates having been detected from the image data in the image frame having been input from the information input unit 10. For example, the position information generating unit 11 generates the position information (coordinates) of respective candidates by setting a two-dimensional coordinate if the camera 21 is a monocular camera, and a three-dimensional coordinate if the camera 21 is a multi-eye camera. The position information generating unit 11 has a function of reflecting a condition regarding a position affecting the tracking of the moving body to the position information of the candidates. The condition may include, for example, an area defined by the coordinate system of a table-tennis table in the tracking of a ball of the table tennis. The position information generating unit 11 has a function of outputting the generated position information to the candidate extracting unit 14.

The candidate position holding unit 12 has a function of holding information of top candidates having been input from the candidate extracting unit 14. The function of the candidate extracting unit 14 and the definition of the top candidates will be described later. The candidate position holding unit 12 has a function of holding, at least, the image frame number, and the position information and the likelihood score of the top candidates, as the information of the top candidates. The likelihood score will be described later.

The position predicting unit 13 has a function of sending an inquiry to the candidate position holding unit 12 about the information of the top candidates in an image frame (a first image frame) consecutively followed by an image frame (a second image frame) specified by the image frame number having been input from the information input unit 10 so as to obtain the thus-requested information.

Here, the consecutive image frames refer to a state where no image frame exists between two image frames, but the two image frames does not have to have consecutive image frame numbers. For example, there may be a case where, even if two image frames are consecutive, their image frame numbers may not be necessarily consecutive since an image frame originally existing between the two image frames before the frame extraction process has been removed by the frame extraction process. The consecutive image frame may refer to an earlier consecutive image frame or a later consecutive image frame. If the moving body is tracked along the flow of time, the consecutive image frame refers to the earlier consecutive image frame. If the moving body is tracked back in time, the consecutive image frame refers to the later consecutive image frame. The consecutive image frame is referred to similarly in the other part in the disclosure according to this patent application.

The position predicting unit 13 has a function of calculating prediction position information in this image frame (the second image frame) for respective top candidates in the consecutive image frame (the first image frame) based on the information obtained from the candidate position holding unit 12. The prediction position information is calculated from, for example, the position and the velocity of one of the top candidates. The position predicting unit 13 defines a motion model considered in calculation of specific information by an environment such that, for example, in a case of the ball of the table tennis, a velocity thereof is changed by bouncing on the table-tennis table. In this embodiment, the motion model is determined from the law of motion in the classical mechanics (Newtonian mechanics), and additionally, a coordinate system that is the specific information by the given environment, a position condition that the tracking target is located, a prediction position calculation formula in the second image frame consecutively following the first image frame, a position score calculation formula based on an existence probability distribution of the tracking target, and a motion score calculation formula based on a velocity of the tracking target. The position predicting unit 13 has a function of outputting the calculated prediction position information to the candidate extracting unit 14.

The candidate extracting unit 14 has a function of calculating the likelihood score from the position information of each of the candidates having been detected from the image data in the image frame (the second image frame) having been input from the position information generating unit 11 and the prediction position information in the identical image frame (the second image frame) having been input from the position predicting unit 13. Here, the likelihood score is a score that indicates a degree of matching of positions for respective combinations of the position information and the prediction position information for each of the candidates. For example, smaller each distance is, larger the score is. The candidate extracting unit 14 has a function of sending an inquiry to the position predicting unit 13 about the prediction position information to be required for calculating the likelihood score so as to obtain this prediction position information. The candidate extracting unit 14 has a function of taking a predetermined number of candidates from the highest in the likelihood score as the top candidates, and outputting their position information to the target position specifying unit 15. The candidate extracting unit 14 has a function of outputting the position information and the like of the top candidates to the candidate position holding unit 12.

The target position specifying unit 15 has a function of calculating an evaluation score from the position information of the top candidates having been input from the candidate extracting unit 14. Here, the evaluation score is a score that indicates a plausibility as the tracking target. The evaluation score may be defined by, for example, a combination of a position score and a motion score. Here, the position score is that quantified based on the existence probability distribution of the object of the tracking target. For example, in the case where the object of the tracking target is a ball of the table tennis, an existence probability of the ball is high in the upper portion from the table-tennis table, thereby resulting in a large position score, and the existence probability of the ball is low in the lower portion from the table-tennis table, thereby resulting in a small position score. Here, the motion score is that quantified based on the velocity of the object of the tracking target.

The information regarding the motion of the specific object of the tracking target that should be considered in addition to the law of motion according to the classical mechanics (Newtonian mechanics) is quantified in the given environment. More specifically, a formula for calculating the motion score is determined, for example, by setting an upper-limit value of the velocity in the given environment to decrease the motion score in an object whose velocity is the same as or more than the upper-limit value, and by increasing the motion score for an object whose velocity meets a condition in consideration of reflection if the object is reflected (bounced back) by a face of a board or the like in the given environment. For example, in the case where the object of the tracking target is the ball of the table tennis, the motion score is smaller if a magnitude of the velocity is 30 m/s or less, and the motion score becomes higher if the ball performs reflex motion near the table-tennis table. As for the definition of the evaluation score, the evaluation score may be defined by a simple summation of the position score and the motion score, a summation of the weighted position score and the weighted motion score, a product of the position score and the motion score, or the like. The target position specifying unit 15 has a function of specifying and regarding the position of the candidate whose evaluation score is the highest as the position of the object of the tracking target in an image frame thereof. The target position specifying unit 15 has a function of outputting the specified position information of the object of the tracking target to the moving body tracking unit 16.

The moving body tracking unit 16 has a function of tracing and tracking the specified position information of the object of the tracking target in the respective image frames having been input from the target position specifying unit 15. The moving body tracking unit 16 has a function of outputting the traced position information in the respective frames of the object of the tracking target to the display unit 23.

The display unit 23 has a function of displaying a trajectory of the object of the tracking target by, for example, consecutively displaying the position information in the respective frames of the object of the tracking target having been input from the moving body tracking unit 16 in the moving body tracking device 1 on a display or the like.

The following describes an operation of the moving body tracking device 1 according to this embodiment. Considering ease of understanding of the description, as an example of the operation of the moving body tracking device according to an embodiment of the disclosure, a moving body tracking device that tracks the ball in the table tennis will be described. Here, while the description will be given with an example where the table tennis is the given environment, other cases where the given environments are a volleyball, a baseball, and a golf, respectively, will be described later as examples.

Figure 3:
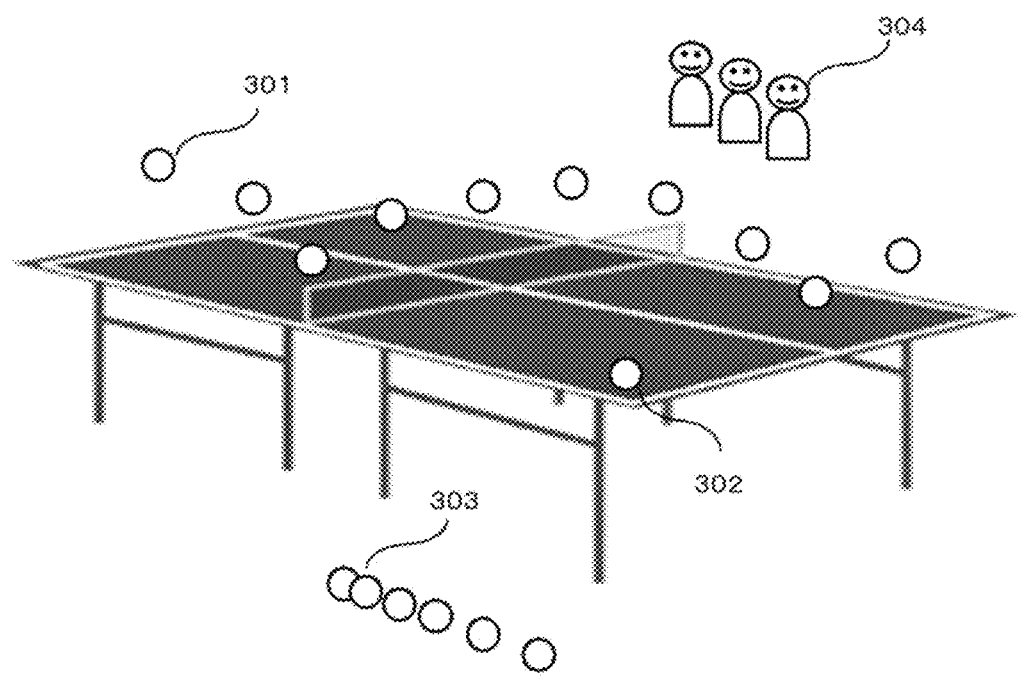
FIG. 3 is a diagram schematically illustrating an image in the table tennis taken by a camera.

Features to be considered in the case where the table tennis is the given environment will be described. FIG. 3 shows a diagram schematically illustrating an image in the table tennis taken by the camera 21. The ball has few features outstanding in appearance such as a color, a shape, and a location of parts. Thus, this embodiment may be characterized in that, if the ball in the image is tried to be detected, those (304) other than the ball, such as faces of spectators, may be falsely detected depending on the detection accuracy of the detector 22. This embodiment also may be characterized in that those other than the object of the tracking target, such as spare balls (302) and balls (303) left on the floor, may be falsely detected in addition to a ball (301) being used in a certain play that is the object of the tracking target. In view of this, it is demanded to track only the object of the tracking target by eliminating the candidates (304) having been falsely detected other than the ball (301) being used in the play, and the falsely-detected candidates (302, 303) that are not the object of the tracking target even if they are balls.

As the feature to be considered if the table tennis is the given environment, this embodiment may be characterized in that it is necessary to manage the change of the object of the tracking target from the ball having been tracked to a new and different ball, for example, if the player changes balls.

As the feature to be considered if the table tennis is the given environment, this embodiment is characterized in that the ball that is the object of the tracking target is located in the upper portion from the table-tennis table with a high probability, as illustrated in FIG. 3. The motion of the ball has a feature that follows the law of motion. This embodiment is characterized in that, while the ball frequently performs a parabolic motion and a motion (301) of changing a direction thereof (bounce) upon hitting the table-tennis table, it is unlikely that the ball is stopped or in a stationary state (302) and performs a slow and straight (rolling) motion (303). When the object of the tracking target is specified, the above mentioned characteristics should be considered to increase the accuracy.

Figure 4:
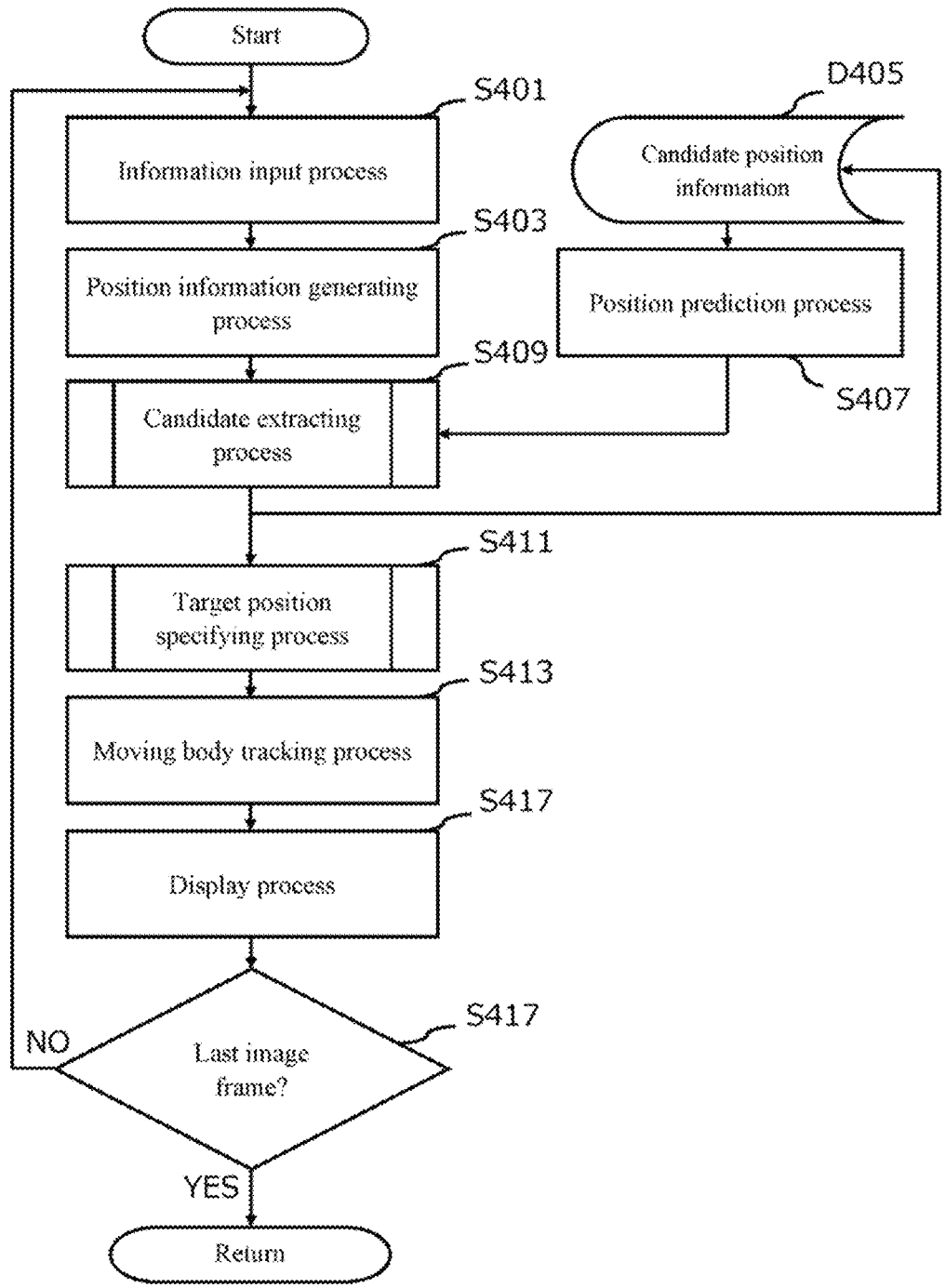
FIG. 4 is a flowchart illustrating an operation of the moving body tracking device.

FIG. 4 shows a flowchart illustrating the operation of the moving body tracking device 1 according to this embodiment. Considering ease of understanding of the description, the explanation is described assuming that the candidate position holding unit 12 in the moving body tracking device 1 has held the information on the top candidates in the first image frame before the execution in FIG. 4.

Figure 5:
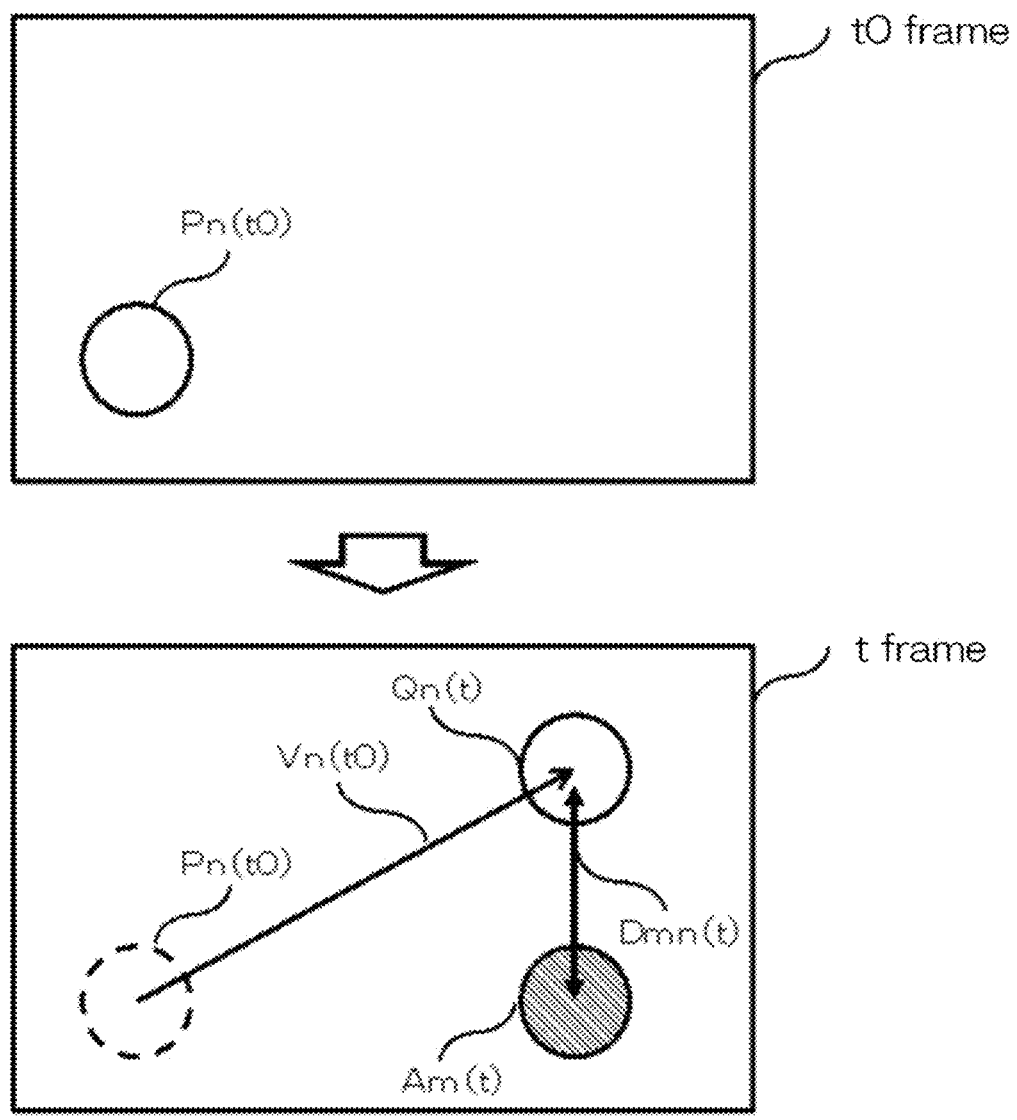
FIG. 5 is a diagram schematically illustrating symbols used for describing the operation of the moving body tracking device.

FIG. 5 shows a diagram schematically illustrating symbols used for describing the operation of the moving body tracking device 1 according to this embodiment. A t0 frame and a t frame are consecutive image frames. $Pn(t0)$ refers to the $n^{th}$ candidate among the top candidates in the t0 frame. $Vn(t0)$ refers to a velocity of $Pn(t0)$. $Qn(t)$ refers to the $n^{th}$ prediction candidate in the t frame, and is predicted to be located in a position in the t frame based on $Pn(t0)$. $Am(t)$ refers to the $m^{th}$ candidate of all the candidates having been detected in the t frame. $Dmn(t)$ refers to a distance between $Qn(t)$ and $Am(t)$. The meanings of these symbols are similarly utilized in other parts of the disclosure according to embodiments of this patent application.

As illustrated in FIG. 4, first, the information input unit 10 executes a process of inputting the information of the candidates having been detected from the image data in the image frame (the second image frame), and then, a process of extracting the necessary information (at least, the image frame numbers and the position information) from the input information to output this necessary information to the position information generating unit 11 and the position predicting unit 13 (S401). In this respect, the frame extraction process may also be executed at this time (S401). After the process of S401 is completed, the operation proceeds to a position information generating process (S403) and a position predicting process (S407).

In the process of S403, the position information generating unit 11 executes a process of converting the position information of the candidates having been input from the information input unit 10 into position information in a coordinate system suitable for the subsequent processes. In the above example of tracking the ball in the table tennis according to this embodiment, assuming that the camera 21 is a multi-eye camera, a description will be given using a three-dimensional coordinate system where the origin is set to be at an intersection point of a perpendicular line drawn from the center of the table-tennis table and the floor surface, an X-axis is taken along a longitudinal direction of the table-tennis table, a Y-axis is taken along a short side (traverse) direction of the table-tennis table, a Z-axis is taken along a perpendicular direction to the table-tennis table surface, an upward direction is positive, and a downward direction is negative. And the surface area of the table-tennis table used for the play may be defined as $-1.370 \leq X \leq 1.370$, $-0.7625 \leq Y \leq 0.7625$, and $Z=0.76$ in the metric system according to the present Cartesian coordinate system. After the completion of the process of S403, the operation proceeds to a candidate detecting process (S409).

In the process of S407, the position predicting unit 13 executes a process of obtaining the position information of the top candidates in one image frame (the first image frame) consecutively followed by another image frame (the second image frame) specified by respective image frame numbers having been input from the information input unit 10 as candidate position information (D405). Next, the position predicting unit 13 executes a process of calculating the prediction position information in the second image frame for the respective top candidates in the first image frame. Assuming that the first image frame is the t0 frame and the second image frame is the t frame, in the example where the ball is tracked in the table tennis in this embodiment, a prediction position Qn(t) is obtained by the following formula. Here, the MKS system may be taken in the following formula, and the same system applies hereinafter.

$$Qn(t)=Pn(t0)+Vn(t0)$$

Note that the case where all the following conditions are met may refer to a case where the ball is located on the upper side from the table-tennis table surface, and the prediction position Qn(t) may be obtained by the following formula considering the bounce. Qn(t).X expresses an X coordinate of Qn(t), Qn(t).Y expresses a Y coordinate of Qn(t), and Qn(t).Z expresses a Z coordinate of Qn(t), respectively, and a similar expression is taken hereinafter.

If $Pn(t0).Z > 0.76$, $-1.370 \leq Qn(t).X \leq 1.370$, and $-0.7625 \leq Qn(t).Y \leq 0.7625$, then, $Qn(t)=(Qn(t).X, Qn(t).Y, |Qn(t).Z-0.76|+0.76)$.

After the completion of the process of S407, the operation proceeds to a candidate extracting process (S409).

In the process of S409, the candidate extracting unit 14 executes a process of calculating the likelihood score from the position information of the candidates having been detected from the image data in the second image frame having been input from the position information generating unit 11 and the prediction position information in the identical second image frame having been input from the position predicting unit 13 so as to extract the top candidates in the second image frame, and outputs the top candidates in the second image frame as the candidate position information (D405). The detail of this process will be described later. After the completion of the process of S409, the operation proceeds to a target position specifying process (S411).

In the process of S411, the target position specifying unit 15 executes a process of calculating the evaluation score from the position information of the top candidates having been input from the candidate extracting unit 14 to specify the position of the candidate whose evaluation score is ranked highest as the position of the object of the tracking target in an image frame thereof. The detail of this process will be described later. After the completion of the process of S411, the operation proceeds to a moving body tracking process (S413).

In the process of S413, the moving body tracking unit 16 executes a process of tracing and tracking the position information of the specified object of the tracking target in the respective image frames having been input from the target position specifying unit 15. After the completion of the process of S413, the operation proceeds to a display process (S415).

In the process of S415, the display unit 23 executes a process of displaying the trajectory of the object of the tracking target by consecutively showing the position information in the respective frames of the object of the tracking target having been input from the moving body tracking unit 16. After the completion of the process of S415, the operation proceeds to an end determining process (S417).

In the process of S417, it is determined whether all the image frames having been input from the detector 22 to the information input unit 10 have been processed or not. In the process of S417, if it is determined that all the image frames have not been processed, the operation proceeds to the process of S401 again. After the information of the candidates having been detected from the image data in the next unprocessed image frame is input in the process of S401, the processes from S401 to S417 are executed. Thus, until all the image frames are processed, the processes from S401 to S417 are repeatedly executed. On the other hand, if it is determined that all the image frames have been processed in the process of S417, the control process illustrated in FIG. 4 is finished.

Figure 6:
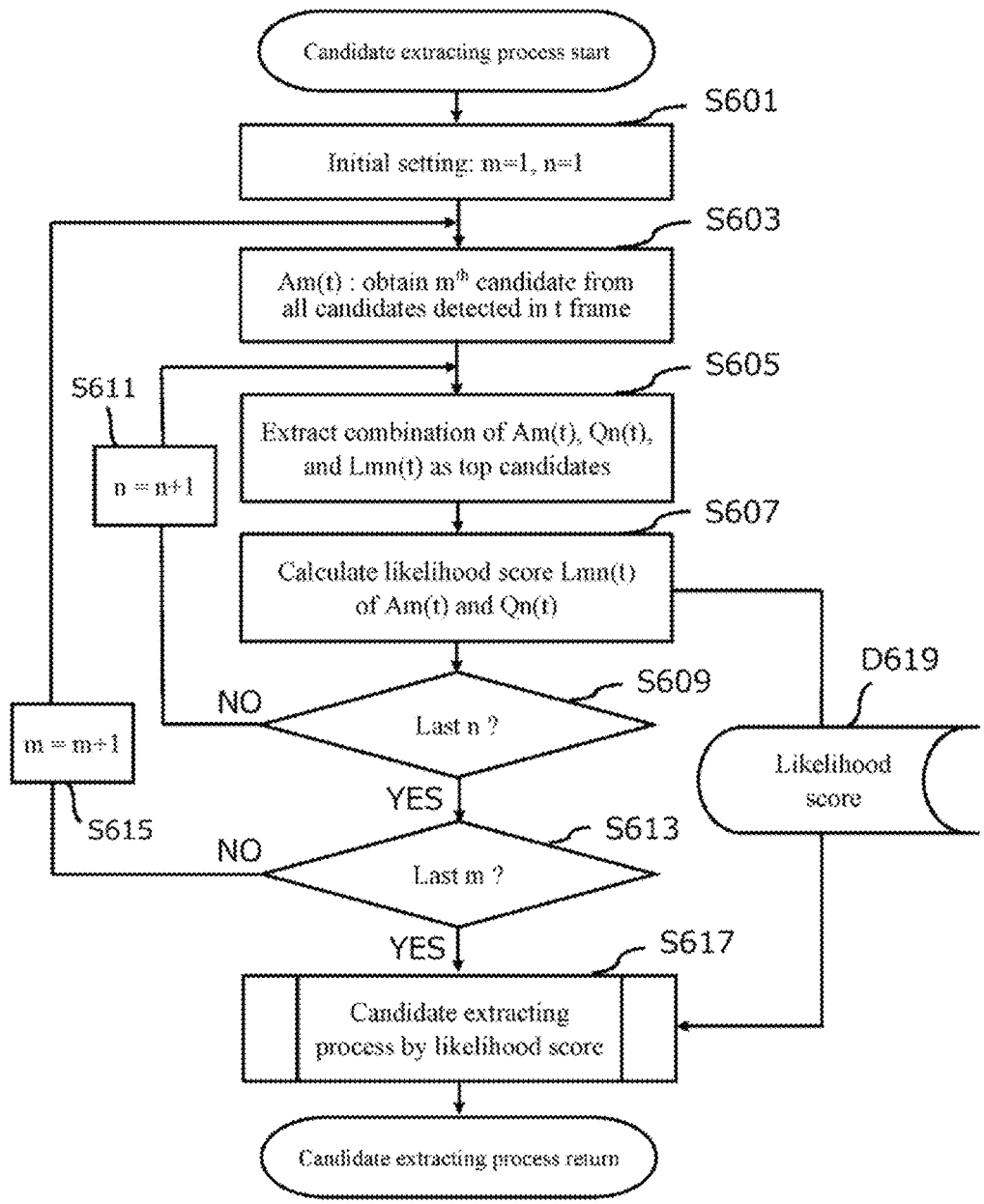
FIG. 6 is a flowchart illustrating an operation of a candidate extracting unit of the moving body tracking device.

The following describes respective processes in subroutines illustrated in FIG. 4 in detail. First, the detail of the candidate extracting process (S409) will be described in reference to FIG. 6. FIG. 6 shows a flowchart illustrating an operation of the candidate extracting unit 14 in the moving body tracking device 1 according to this embodiment.

As described above, in the candidate extracting process (S409), the candidate extracting unit 14 calculates the likelihood score from the position information of the candidates having been detected from the image data in the second image frame having been input from the position information generating unit 11 and the prediction position information in the identical second image frame having been input from the position predicting unit 13 so as to extract the top candidates in the second image frame. In this embodiment, an explanation will be described by taking the number of the extracted top candidates as a natural number N.

As illustrated in FIG. 6, first, the candidate extracting unit 14 sets m=1 and n=1 as initial values (S601).

In the process of S603, the candidate extracting unit 14 obtains Am(t) that is the $m^{th}$ candidate of all the candidates having been obtained in the process of S403.

In the process of S605, the candidate extracting unit 14 obtains Qn(t) that is the $n^{th}$ candidate from the prediction candidates having been obtained in the process of S407.

In the process of S607, the candidate extracting unit 14 calculates a likelihood score Lmn(t) (hereinafter the likelihood score is similarly represented by Lmn(t) in the disclosure according to this patent application) of a combination of Am(t) and Qn(t), and holds a result thereof (D619). Lmn(t) may be obtained from the distance Dmn(t) between Am(t) and Qn(t) by the following formula.

$Lmn(t)=\exp(-Dmn(t)^2)$

In the process of S609, the candidate extracting unit 14 determines whether Qn(t) is the last prediction candidate having been obtained in the process of S407 or not. If the candidate extracting unit 14 determines that Qn(t) is not the last prediction candidate, after the process of adding one (1) to n (S611), the operation proceeds to the process of S605 again. Thus, until all the prediction candidates are processed, the processes from S605 to S609 are repeatedly executed. On the other hand, in the process of S609, if the candidate extracting unit 14 determines that Qn(t) is the last prediction candidate, the operation proceeds to the process of S613.

In the process of S613, the candidate extracting unit 14 determines whether Am(t) is the last candidate having been obtained in the process of S409 or not. If the candidate extracting unit 14 determines that Am(t) is not the last candidate, after the process of adding one (1) to m (S615), the operation proceeds to the process of S603 again. Thus, until all the candidates are processed, the processes from S603 to S613 are repeatedly executed. On the other hand, in the process of S613, if the candidate extracting unit 14 determines that Am(t) is the last prediction candidate, the operation proceeds to a candidate extracting process with the likelihood score (S617).

In the candidate extracting process with the likelihood score (S617), the candidate extracting unit 14 extracts top N sets of combinations of Am(t), Qn(t), and Lmn(t) in the likelihood score as the candidates. The candidate extracting unit 14 completes the candidate extracting process to return to the main routine.

Figure 7:
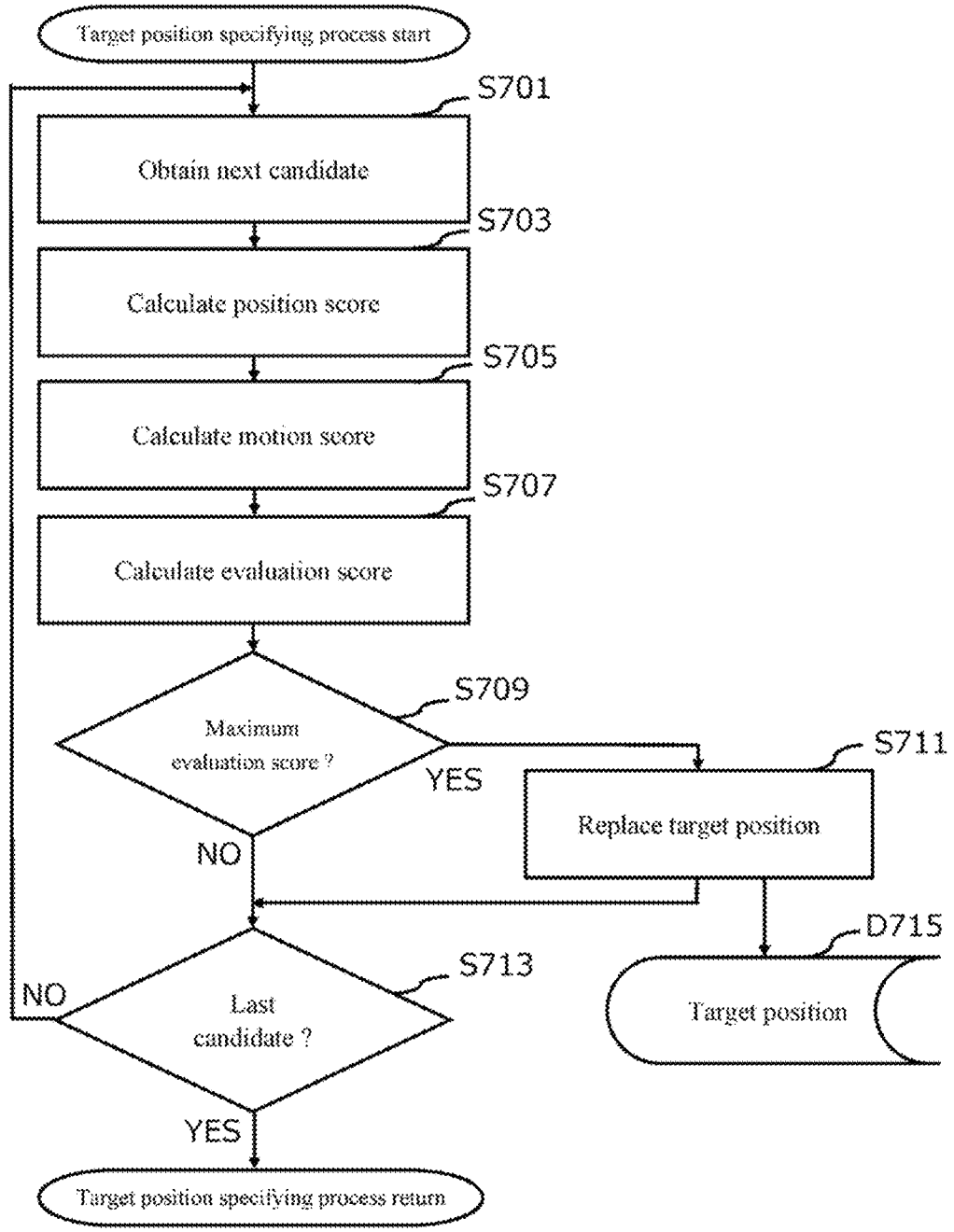
FIG. 7 is a flowchart illustrating an operation of a target position specifying unit of the moving body tracking device.

The detail of the target position specifying process (S411) will be described in reference to FIG. 7. FIG. 7 shows a flowchart illustrating an operation of the target position specifying unit 15 in the moving body tracking device 1 according to this embodiment.

In the process of S701, the target position specifying unit 15 obtains the candidates having been obtained in the process at S409 in order.

In the process of S703, the target position specifying unit 15 calculates a position score (Sp).

In the example where the ball is tracked in the table tennis in this embodiment, the position score (Sp) is obtained by the following formula in respective cases where the coordinates are specified as follows.

If $-1.370 \leq X \leq 1.370$, $-0.7625 \leq Y \leq 0.7625$, and $Z \geq 0.76$, then $Sp=1.0$.

If $-1.370 \leq X \leq 1.370$, $-0.7625 \leq Y \leq 0.7625$, and $Z < 0.76$, then $Sp=0.0$.

In the case other than the above, if $-0.7625 \leq Y \leq 0.7625$, then $Sp=\exp(-(|X|-1.370)^2)$ In the case other than any of the above, $Sp=\exp(-(2(|Y|-0.7625)(|X|-1.370))^2)$.

In the process of S705, the target position specifying unit 15 calculates a motion score (Sm). In the example where the ball is tracked in the table tennis in this embodiment, the motion score (Sm) is obtained by the following formula in respective cases where the coordinates are specified as follows.

If $Vz=0.0$, then $Sm=0.001$.

In the case other than the above, $Sm=\min\{1.0, 1-|V/30-1|\}$.

In the process of S707, the target position specifying unit 15 calculates the evaluation score from the position score and the motion score. In the example where the ball is tracked in the table tennis in this embodiment, the evaluation score is calculated by summing the position score and the motion score.

In the process of S709, the target position specifying unit 15 determines whether the evaluation score having been calculated in the process of S707 is the maximum compared with the other evaluation scores having been obtained so far. If the target position specifying unit 15 determines that the evaluation score calculated in the process of S707 is the maximum, the operation proceeds to the process of S711 to replace a target position D715 with Am(t) whose evaluation score has been determined to be the maximum. If the target position specifying unit 15 determines that the evaluation score calculated in the process of S707 is not the maximum, the operation proceeds to the process of S713.

In the process of S713, the target position specifying unit 15 determines whether the candidate is the last candidate. If the target position specifying unit 15 determines that the candidate is not the last candidate, the operation proceeds to the process of S701 again. Thus, until all the candidates are processed, the processes from S701 to S713 are repeatedly executed. On the other hand, if the target position specifying unit 15 determines that the candidate is the last candidate, Am(t) whose evaluation score has been determined to be the maximum is specified as the target position D715, and the target position specifying process is completed to return to the main routine.

The explanation of a moving body tracking program for causing the computer system to function as the moving body tracking device 1 will be described as follows. The configuration of the computer system is illustrated in FIG. 2.

The moving body tracking program includes a main module, an input module, and an arithmetic processing module. The main module is a part that integrally controls the image processing. The input module operates the computer system so as to obtain the image data in the image frame. The arithmetic processing module includes a position information generating module, a candidate position holding module, a position predicting module, a candidate extracting module, a target position specifying module, and a moving body tracking module. Respective functions achieved by executing the main module, the input module, and the arithmetic processing module are similar to the functions of the information input unit 10, the position information generating unit 11, the candidate position holding unit 12, the position predicting unit 13, the candidate extracting unit 14, the target position specifying unit 15, and the moving body tracking unit 16 in the moving body tracking device 1.

The moving body tracking program is provided by, for example, a storage medium such as a ROM, or a semiconductor memory. The moving body tracking program may be provided via the network.

As described above, in the moving body tracking device 1 according to this embodiment, the position information generating unit 11 generates the position information of the respective candidates from the information of the candidates having been detected from the image data in the image frame (the second image frame) having been input from the information input unit 10, the position predicting unit 13 calculates the prediction position in this image frame (the second image frame), the candidate extracting unit 14 calculates a plurality of and the predetermined number of top candidates in the second image frame from the prediction position and the top candidates in the first image frame having been obtained from the candidate position holding unit 12, and outputs the thus-calculated top candidates to the candidate position holding unit 12 where they are held. Thus, the predetermined and plurality of top candidates for the respective image frames are so held by the candidate position holding unit 12 that an appropriate distinction of the object of the tracking target under the environment having the feature that something other than the object of the tracking target such as a spare ball and a ball left on the floor may be detected in addition to the ball used in the certain play that is the object of the tracking target.

In the moving body tracking device 1 according to this embodiment, the target position specifying unit 15 specifies the position information of the object of the tracking target in the image frame based on the evaluation score. The evaluation score may be defined by the combination of the position score and the motion score. The moving body tracking unit 16 traces the specified position information of the object in the consecutively following image frames such that the movement of the object may be tracked. Thus, calculating the evaluation score by the combination of the position score and the motion score in the given environment (for example, the table tennis) ensures specifying the object of the tracking target with high accuracy if a plurality of candidates may be detected since the object has few features outstanding in appearance such as the color, the shape, and the location of parts.

EXAMPLES

In the description for the operation of the moving body tracking device 1 according to this embodiment, considering ease of understanding of the description, as an example of the operation of the moving body tracking device according to an embodiment of the disclosure, the moving body tracking device that tracks the ball in the table tennis has been described. This is referred to as Example 1. In a way of comparing with Example 1, an example of ball tracking in the volleyball (Example 2), an example of ball tracking in pitching in the baseball (Example 3), and an example of ball tracking in the golf (Example 4) will be described.

In Example 1 and Example 2 to Example 4, the same configuration of the moving body tracking device 1 as illustrated in FIG. 1 according to this embodiment may be utilized, and the device 2 as illustrated in FIG. 2 may also be realized in a similar way. The contents of the processes are different since the conditions by the given environments are different. Specifically, there are following different points.

A different coordinate system may be more suitable for the process in which the position information generating unit 11 converts the position information having been input from the information input unit 10.

A different condition may apply with respect to the position that affects the tracking of the moving body reflected by the generation of the position information by the position information generating unit 11. For example, if the given environment is the table tennis, the coordinate system utilizing the respective sides and the height of the table-tennis table may be set as the condition regarding the position. If the given environment is the volleyball, the coordinate system utilizing the respective sides of the coat may be set as the condition regarding the position.

A different formula may be utilized when the position predicting unit 13 calculates the prediction position. The prediction position may be calculated with a formula based on the law of motion in the classical mechanics (Newtonian mechanics) and the motion model that is the specific information depending on the given environment in addition thereto.

A different formula may be utilized when the target position specifying unit 15 calculates the position score. The position score is that quantified based on the existence probability distribution of the object of the tracking target. While specific formulas that calculate the position score will be described later, the way of thinking for each given environment is as follows. If the object of the tracking target is the ball in the table tennis, the existence probability of the ball is high in the upper portion from the table-tennis table, thereby causing a large position score, and the existence probability of the ball is low in the lower portion from the table-tennis table, thereby causing a small position score. If the object of the tracking target is the ball in the volleyball, the existence probability of the ball is high in the upper portion from the coat, thereby causing a large position score. If the object as the tracking target is the ball in the baseball (pitching), the existence probability of the ball is high in the upper portion from an area connecting the pitcher's mound and the home base, thereby causing a large position score. If the object of the tracking target is the ball in the golf, the position score is calculated in the case where a flying distance in a hitting direction of the ball is longer than the height of the ball.

A different formula may be utilized when the target position specifying unit 15 calculates the motion score. The formulas for calculating the motion score are determined, for example, by setting the upper-limit value of the velocity in the given environment to decrease the motion score in the object whose velocity is the upper-limit value or higher, by increasing the motion score for the object whose velocity meets the condition in consideration of the reflection (bounce) when the object is reflected (bounced) by the face of the board or the like in the given environment, and by extremely decreasing the motion score in the object fixed to the floor surface.

The above-described features in the motion model are summarized in the following Tables with respect to Example 1 to Example 4. Features of Example 1 are summarized in Table 1, features of Example 2 are summarized in Table 2, features of Example 3 are summarized in Table 3, and features Example 4 are summarized in Table 4. The motion model is a model for the motion of the object in the given environment used in prediction of the position of the object tracked using the image data. The motion model is made based on the law of motion in the classical mechanics (Newtonian mechanics) and the specific information by the given environment that should be considered in addition thereto. In the position prediction of the tracking target (the ball) in Example 1 to Example 4, the motion models are made based on conditions described in the respective corresponding tables in addition to the law of motion.

TABLE 1

|  | Example 1 |  |
| --- | --- | --- |
| Tracking target | Ball in the table tennis | |
| Coordinate system | (Dimension) | Three dimensional |
|  | (Origin) | Intersection point of perpendicular line drawn from center of table-tennis table and floor surface, |
|  | (X-axis) | Longitudinal direction of table-tennis table |
|  | (Y-axis) | Short side direction of table-tennis table |
|  | (Z-axis) | Perpendicular direction to table-tennis table (positive in upward) |
| Position condition | (Surface arear of table-tennis table in coordinate system) $-1.370 \leq X \leq 1.370$ $-0.7625 \leq Y \leq 0.7625$ $Z = 0.76$ | |
| Prediction position | $Pn(t0)$: $n^{th}$ candidate among top candidates in t0 frame. $Vn(t0)$: velocity calculated from $Pn(t0)$ and parent thereof. Prediction position: $Qn(t0) = Pn(t0) + Vn(t0)$. When all following conditions are satisfied: Condition A) $Pn(t).Z > 0.76$, Condition B) $-1.370 \leq Qn(t).X \leq 1.370$, and Condition C) $-0.7625 \leq Qn(t).Y \leq 0.7625$, Prediction position may be given by: $Qn(t) = (Qn(t).X, Qn(t).Y, |Qn(t).Z - 0.76| + 0.76)$. | |
| Position score | Case 11) when condition 11 is satisfied, position score = 1.0. Condition 11) $-1.370 \leq X \leq 1.370$ and $-0.7625 \leq Y \leq 0.7625$ and $Z \geq 0.76$. Case 12) when condition 12 is satisfied, position score = 0.0. Condition 12) $-1.370 \leq X \leq 1.370$ and $-0.7625 \leq Y \leq 0.7625$ and $Z \leq 0.76$. Case 13) when condition 13 is satisfied, position score = $\exp\{-(|X| - 1.370)^2\}$. Condition 13) other than conditions 11 and 12 and $-0.7625 \leq Y \leq 0.7625$. Case 14) when condition 14 is satisfied, position score = $\exp[-\{2(|Y| - 0.7625)(|X| - 1.370)\}^2]$. Condition 13) other than conditions 11, 12, and 13. Notes: "^" represents exponential function and "(number)^2" represents square of (number). | |
| Motion score | Motion score = $\min\{1.0, 1 - |V/30 - 1|\}$ Here, when $Vz = 0.0$, motion score = 0.001. | |

TABLE 2

|  | Example 2 |  |
| --- | --- | --- |
| Tracking target | Ball in the volleyball | |
| Coordinate system | (Dimension) | Three dimensional. |
|  | (Origin) | Center of court (floor surface). |
|  | (X-axis) | Longitudinal direction of court. |
|  | (Y-axis) | Short side direction of court. |
|  | (Z-axis) | Vertical direction to floor surface (positive in upward). |
| Position condition | (Surface area of court in coordinate system) $-9.0 \leq X \leq 9.0$ and $-4.5 \leq Y \leq 4.5$. | |
| Prediction position | $Pn(t0)$: $n^{th}$ candidate among top candidates in t0 frame. $Vn(t0)$: velocity calculated from $Pn(t0)$ and parent thereof. Prediction position: $Qn(t0) = Pn(t0) + Vn(t0)$. | |
| Position score | Case 21) when condition 21 is satisfied, position score = 1.0. Condition 21) $-9.0 \leq X \leq 9.0$ and $-4.5 \leq Y \leq 4.5$. Case 22) other than condition 21), position score = $\exp[-\{(|Y| - 4.5)(|X| - 9.0)\}^2]$. Notes: "^" represents exponential function and "(number)^2" represents square of (number). | |
| Motion score | Motion score = $\min\{1.0, 1 - |V/30 - 1|\}$. Here, when $Vz = 0.0$, motion score = 0.001. | |

TABLE 3

|  | Example 3 |  |
| --- | --- | --- |
| Tracking target | Ball in pitching in the baseball | |
| Coordinate system | (Dimension) | Two dimensional. |
|  | (Origin) | Pitcher's mound (ground). |

TABLE 3-continued

Example 3

| | | |
|---|---|---|
| | (X-axis) | Vertical direction to ground (positive in upward). |
| | (Y-axis) | Direction form pitcher's mound to home base. |
| Position condition | N.A. | |
| Prediction position | $P_n(t0)$: $n^{th}$ candidate among top candidates in t0 frame.<br>$V_n(t0)$: velocity calculated from $P_n(t0)$ and parent thereof.<br>Prediction position: $Q_n(t0) = P_n(t0) + V_n(t0)$. | |
| Position score | Case 31) when condition 31 is satisfied, position score = $1 - |X - 1.0|$.<br>Condition 31) $0 \leq X \leq 2.0$ and $05 \leq Y \leq 18.44$.<br>Case 32) other than condition 31), position score = 0.0. | |
| Motion score | Motion score = $\min\{1.0, 1 - |V/50 - 1|\}$.<br>Here, when $V_y = 0.0$, motion score = 0.0. | |

TABLE 4

Example 4

| | | |
|---|---|---|
| Tracking target | Ball in the golf | |
| Coordinate system | (Dimension) | Two dimensional |
| | (Origin) | Position of ball before hitting (ground) |
| | (X-axis) | Vertical direction to ground (positive in upward) |
| | (Y-axis) | Direction of hitting ball |
| Position condition | N.A. | |
| Prediction position | $P_n(t0)$: $n^{th}$ candidate among top candidates in t0 frame.<br>$V_n(t0)$: velocity calculated from $P_n(t0)$ and parent thereof.<br>Prediction position: $Q_n(t0) = P_n(t0) + V_n(t0)$ | |
| Position score | Case 41) when condition 41 is satisfied, position score = $1 - |X/Y|$.<br>Condition 41) $-y \leq X \leq y$.<br>Case 42) other than condition 41), position score = 0.0. | |
| Motion score | Motion score = $\min\{1.0, 1 - |V/100 - 1|\}$<br>Here, when $V_y = 0.0$, motion score = 0.0. | |

Embodiment 2

A moving body tracking device according to Embodiment 2 has a configuration illustrated in FIG. 1 identical to that of the moving body tracking device 1 according to Embodiment 1, and is also realized as the device 2 illustrated in FIG. 2 in a similar manner thereof. As for the function, the moving body tracking device 1 and the candidate extracting unit 14 of Embodiment 1 have different functions from those of Embodiment 2. Therefore, the candidate extracting unit will be mainly described, but the description overlapping that of Embodiment 1 will be omitted.

The candidate extracting unit 14 according to Embodiment 2 has a function of calculating the likelihood score from the position information of the candidate having been detected from the image data in the image frame (the second image frame) having been input from the position information generating unit 11 and the prediction position information in the same image frame (the second image frame) having been input from the position predicting unit 13. The candidate extracting unit 14 has a function of sending an inquiry to the position predicting unit 13 about the prediction position information required for calculating the likelihood score to obtain this prediction position information. The candidate extracting unit 14 has a function of taking a predetermined number of candidates from the top (hereinafter referred to as "top candidates") in the likelihood score as the top candidates, and outputting position information of the top candidates to the target position specifying unit 15. The candidate extracting unit 14 has a function of outputting the position information and the like of the top candidates to the candidate position holding unit 12. The candidate extracting unit 14 according to Embodiment 2 has these functions in a similar manner with the candidate extracting unit 14 according to Embodiment 1.

The candidate extracting unit 14 according to Embodiment 2 has a function of setting the upper limit of the number of a plurality of candidates in the image frame (the second image frame) based on the prediction position information derived from the same candidate in the image frame (the first image frame) used as the basis of the calculation of the prediction position information by the position predicting unit 13, when extracting a plurality of top candidates. The candidate extracting unit 14 according to Embodiment 2 is different from the candidate extracting unit 14 according to Embodiment 1 in this point.

Figure 8:
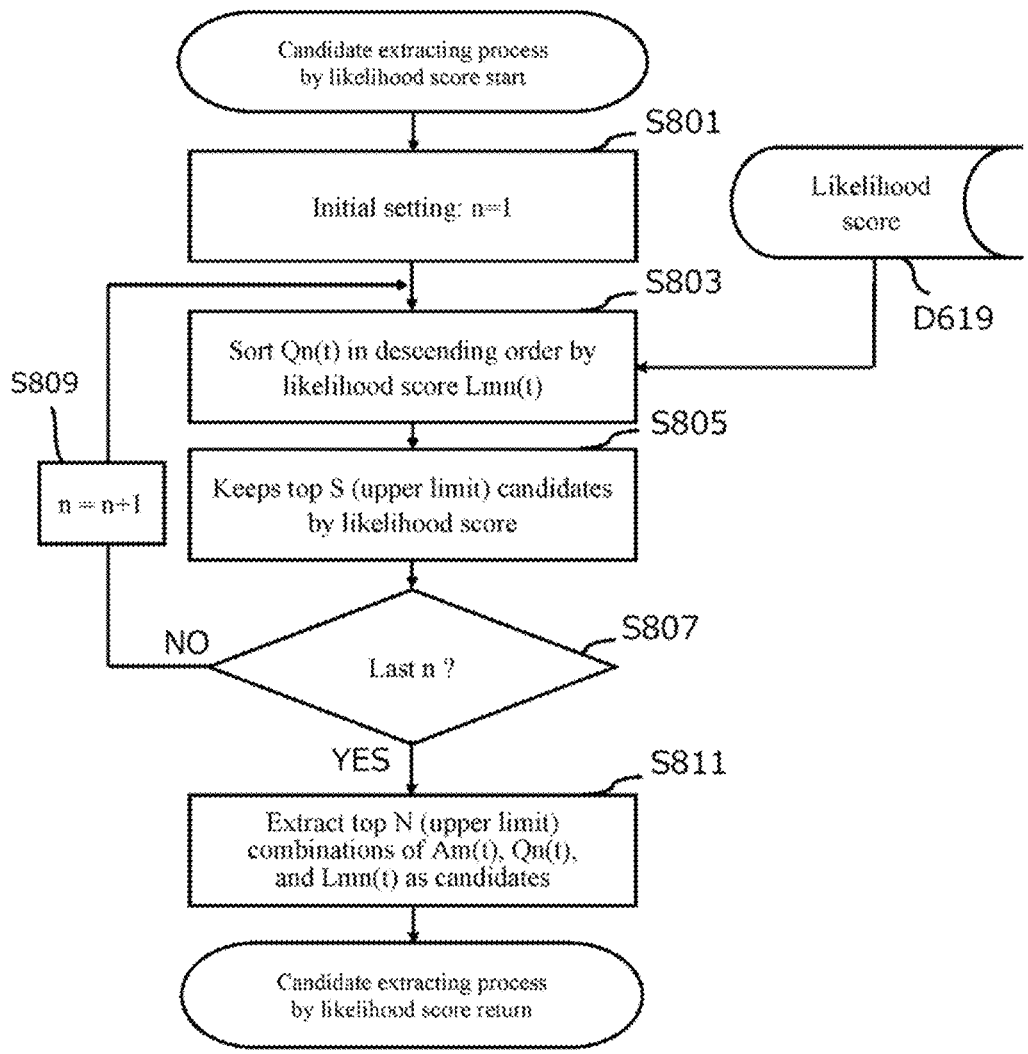
FIG. 8 is a flowchart illustrating a candidate extracting process with a likelihood score according to Embodiment 2.

The above-described difference comes from the difference in the candidate extracting process by the likelihood score (S617) illustrated in FIG. 6. FIG. 8 shows a flowchart illustrating a candidate extracting process by the likelihood score (S617) according to Embodiment 2.

As illustrated in FIG. 8, first, the candidate extracting unit 14 sets n=1 as the initial value (S801).

In the process of S803, the candidate extracting unit 14 obtains the combinations of $A_m(t)$, $Q_n(t)$, and $L_{mn}(t)$ as combination data. The candidate extracting unit 14 sorts the combination data in the descending order of the likelihood score $L_{mn}(t)$ such that the combination data such as $Q_n(t)$ to be taken as the basis of the calculation may be listed in the descending order of $L_{mn}(t)$.

In the process of S805, the candidate extracting unit 14 keeps up to S (natural number) pieces of combination data from the highest in the likelihood score as the candidates based on $Q_n(t)$.

In the process at S807, the candidate extracting unit 14 determines whether $Q_n(t)$ is the last prediction candidate obtained in the process at S407 or not. If the candidate extracting unit 14 determines that $Q_n(t)$ is not the last prediction candidate, after the process of adding one to n (S809), the operation proceeds to the process of S803 again. Thus, until the processes are executed on all the prediction candidates, the processes from S803 to S807 are repeatedly executed. On the other hand, in the process of S807, if the candidate extracting unit 14 determines that $Q_n(t)$ is the last prediction candidate, the operation proceeds to the process at S811.

In the process of S811, the candidate extracting unit 14 extracts N combinations of $A_m(t)$, $Q_n(t)$, and $L_{mn}(t)$ having top N highest likelihood scores from the candidates kept in the process of S805 as the top candidates, and then, the candidate extracting process by the likelihood score is completed and proceeds to the main routine.

Figures 9, 10A:
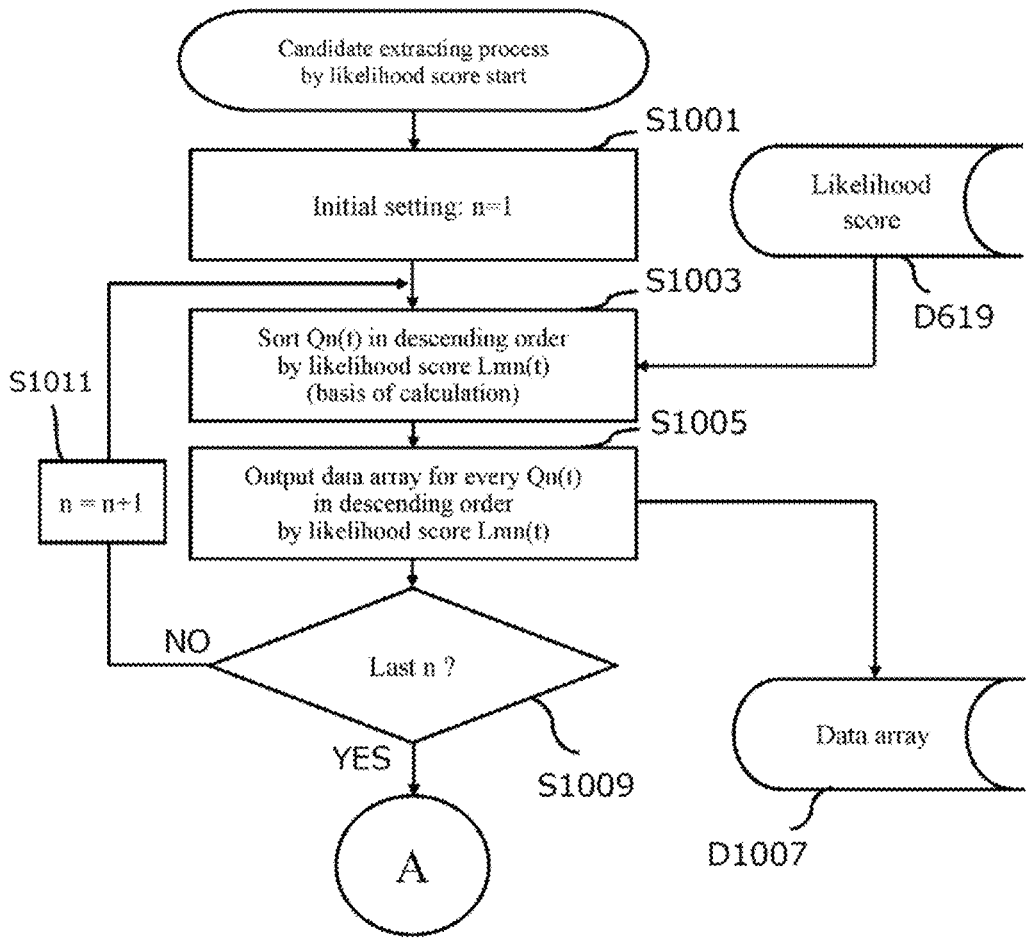
FIG. 9 is a diagram schematically illustrating the candidate extracting process with the likelihood score executed by the candidate extracting unit according to Embodiment 2.
FIG. 10A is a flowchart (first half) illustrating the candidate extracting process with the likelihood score according to Embodiment 3.

FIG. 9 is a diagram schematically illustrating the candidate extracting process by the likelihood score (S617) executed by the candidate extracting unit 14 according to Embodiment 2. In FIG. 9, the combination data is arrayed in descending order of the likelihood score Lmn(t) from left to right in respective rows for corresponding prediction candidates Qn(t). In the process of S805, the candidate extracting unit 14 keeps up to S (natural number) pieces of combination data from the highest in the likelihood score as the candidates calculated based on Qn(t). FIG. 9 shows an example where S=4, and illustrates that data in a shaded area should be removed from the candidates. In the process of S811, the candidate extracting unit 14 extracts the top N candidates having the N highest likelihood scores from the candidates having been kept in the process of S805. In FIG. 9, this corresponds to extracting the top candidates having the N highest likelihood scores from the data candidates in a non-shaded area.

The candidate extracting unit 14 according to Embodiment 2 extracts the top candidates from the candidates equally kept for the respective prediction candidates Qn(t) as illustrated in FIG. 9, thereby reducing a bias to a specific prediction candidate Qn(t). Therefore, the top candidates including some candidates other than those that exist near a promising candidate should be kept. In view of this, for example, if the object of the tracking target is changed to a new and different ball as the ball having been used by the player is changed, or if an erroneously detected object other than the ball is temporarily tracked, the tracking can be continued by returning to the correct object as the tracking target.

Embodiment 3

A moving body tracking device according to Embodiment 3 has a configuration illustrated in FIG. 1 identical to that of the moving body tracking device 1 according to Embodiment 1, and is also realized as the device 2 illustrated in FIG. 2 in a similar manner thereof. As for the function, the moving body tracking device 1 and the candidate extracting unit 14 of Embodiment 1 have different functions therefrom. Therefore, the candidate extracting unit 14 will be mainly described, but the description overlapping that of Embodiment 1 will be omitted.

The candidate extracting unit 14 according to Embodiment 3 has a function of calculating the likelihood score from the position information of the candidate having been detected from the image data in the image frame (the second image frame) having been input from the position information generating unit 11 and the prediction position information in the same image frame (the second image frame) having been input from the position predicting unit 13. The candidate extracting unit 14 has a function of sending an inquiry to the position predicting unit 13 about the prediction position information required for calculating the likelihood score to obtain this prediction position information. The candidate extracting unit 14 has a function of taking a predetermined number of candidates having likelihood scores from the top in the likelihood score as the top candidates, and a function of outputting position information of the top candidates to the target position specifying unit 15. The candidate extracting unit 14 has a function of outputting the position information and the like of the top candidates to the candidate position holding unit 12. The candidate extracting unit 14 according to Embodiment 3 has these functions in a similar manner with the candidate extracting unit 14 according to Embodiment 1.

The candidate extracting unit 14 according to Embodiment 3 has a function of, for all the candidates in the image frame (the first image frame) used as the basis of the calculation of the prediction position information by the position predicting unit 13, extracting at least one candidate in the second image frame under a condition that the likelihood score of each candidate is equal to or more than a threshold, when extracting the top candidates. The candidate extracting unit 14 according to Embodiment 3 is different from the candidate extracting unit 14 according to Embodiment 1 in this point.

Figure 10B:
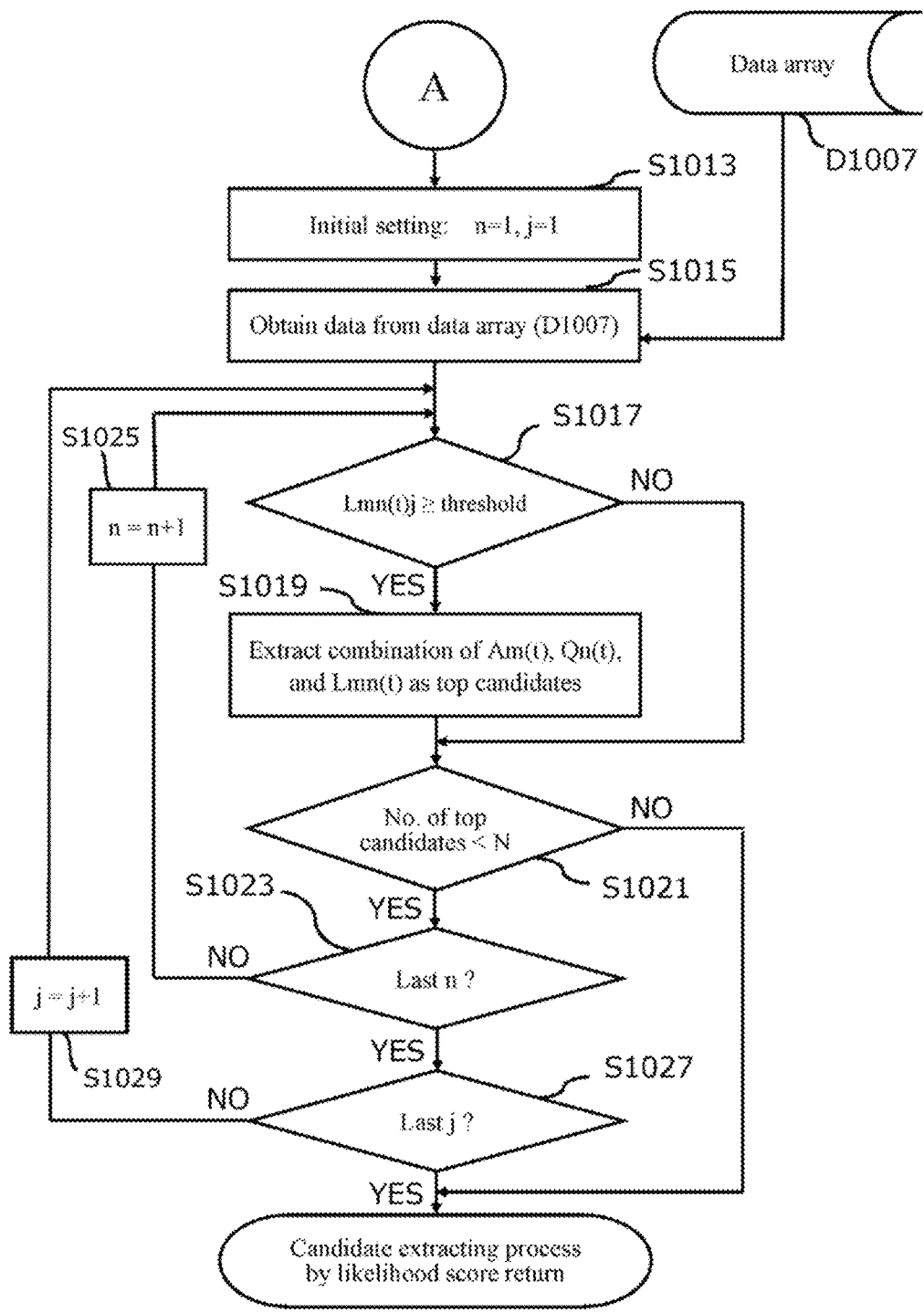
FIG. 10B is a flowchart (second half) illustrating the candidate extracting process with the likelihood score according to Embodiment 3.

The above-described difference comes from the difference in the candidate extracting process by the likelihood score (S617) illustrated in FIG. 6. FIG. 10A and FIG. 10B show flowcharts illustrating a candidate extracting process by the likelihood score (S617) according to the Embodiment 3.

As illustrated in FIG. 10A, first, the candidate extracting unit 14 sets n=1 as the initial value (S1001).

In the process of S1003, the candidate extracting unit 14 obtains the combinations of Am(t), Qn(t), and Lmn(t) as combination data. The candidate extracting unit 14 sorts the data in the descending order by the likelihood score Lmn(t) to array the combination data taking Qn(t) as the basis of the calculation, in the descending order of Lmn(t).

In the process of S1005, the candidate extracting unit 14 outputs a data array (D1007) of the combinations of Am(t), Qn(t), and Lmn(t) generated in the process of S1003.

In the process of S1009, the candidate extracting unit 14 determines whether Qn(t) is the last prediction candidate obtained in the process at S407 or not. If the candidate extracting unit 14 determines that Qn(t) is not the last prediction candidate, after the process of adding one to n (S1011), the operation proceeds to the process of S1003 again. Thus, until the processes are executed on all the prediction candidates, the processes from S1003 to S1009 are repeatedly executed. On the other hand, in the process of S1009, if the candidate extracting unit 14 determines that Qn(t) is the last prediction candidate, the operation proceeds to the process of S1013 illustrated in FIG. 10B.

As illustrated in FIG. 10B, the candidate extracting unit 14 again sets n=1 and j=1 as the initial values (S1013).

In the process of S1015, the candidate extracting unit 14 obtains the combination data of $j^{th}$ combination of Am(t), Qn(t), and Lmn(t) in the descending order of the likelihood score Lmn(t) for the prediction candidate Qn(t) from the data array (D1007).

In the process of S1017, the candidate extracting unit 14 determines whether Lmn(t) is equal to or more than the threshold for the combination data obtained in the process of S1015 or not. If the candidate extracting unit 14 determines that Lmn(t) is equal to or more than the threshold, the combination of Am(t), Qn(t), and Lmn(t) obtained in the process of S1015 is extracted as one of the top candidates (S1019), and the operation proceeds to the process of S1021. On the other hand, if the candidate extracting unit 14 determines that Lmn(t) is less than the threshold, the operation proceeds to the process of S1021.

In the process of S1021, the candidate extracting unit 14 determines whether the number of top candidates having been extracted so far is smaller than N or not. If the candidate extracting unit 14 determines that the number of top candidates is smaller than N, the operation proceeds to the process of S1023. On the other hand, if the candidate extracting unit 14 determines that the number of top candidates is not smaller than N, the candidate extracting process by the likelihood score is terminated so as to proceeds to the main routine.

In the process of S1023, the candidate extracting unit 14 determines whether Qn(t) is the last prediction candidate obtained in the process of S407 or not. If the candidate extracting unit 14 determines that Qn(t) is not the last prediction candidate, after the process of adding one to n (S1025), the operation proceeds to the process of S1017 again. Thus, until the processes are executed on all the prediction candidates, the processes from S1017 to S1023 are repeatedly executed. On the other hand, in the process of S1023, if the candidate extracting unit 14 determines that Qn(t) is the last prediction candidate, the operation proceeds to the process of S1027.

In the process of S1027, the candidate extracting unit 14 determines whether j is the tail end for the prediction candidate Qn(t) in the data array (D1007) or not. If the candidate extracting unit 14 determines that j is not the tail end for the prediction candidate Qn(t), after the process of adding one to j (S1029), the operation proceeds to the process of S1017 again. Thus, until j becomes the tail end in the data array for the prediction candidate Qn(t), the processes from S1017 to S1027 are repeatedly executed. On the other hand, in the process at S1027, if the candidate extracting unit 14 determines that j is the tail end for the prediction candidate Qn(t), the candidate extracting process by the likelihood score ends so as to proceeds to the main routine.

FIG. 11 shows a diagram schematically illustrating the candidate extracting process by the likelihood score (S617) executed by candidate extracting unit 14 according to Embodiment 3. In FIG. 11, the data is arrayed in descending order of the likelihood score Lmn(t) from left to right in each row for each prediction candidate Qn(t). The data array (D1007) generated in the processes from S1001 to S1011 illustrated in FIG. 10A is schematically illustrated in FIG. 11. The determination whether the likelihood score is equal to or more than the threshold is performed in the process of S1017, as moving downward from the first row for respective columns in FIG. 11 in the process of S1023, and as moving in order from the first column for respective rows in FIG. 11 in the process of S1027. In FIG. 11, the non-shaded area corresponds to combination data in which likelihood scores thereof are equal to or more than the threshold.

The candidate extracting unit 14 according to Embodiment 3 extracts the top candidates from the candidates equally kept for the respective prediction candidates Qn(t) as the description of FIG. 11, thereby reducing the bias to the specific prediction candidate Qn(t). The candidate having a likelihood score smaller than the threshold would not be kept for the top candidates such that Embodiment 3 is superior to Embodiment 2 in the point that the candidate having low possibility (for example, Q3(t) in FIG. 11) can be eliminated. Therefore, the top candidates including some candidates other than those that exist near a promising candidate should be kept. In view of this, for example, if the object of the tracking target is changed to a new and different ball as the ball having been used by the player is changed, or if an erroneously detected object other than the ball is temporarily tracked, the tracking can be continued with higher accuracy by returning to the correct object as the tracking target.

What is claimed is:

1. A moving body tracking device for tracking a movement of an object to be detected by an pattern matching method in a given environment using image data, comprising:
   a position information generating unit capable of generating position information of the object in each of all image frames;
   a candidate position holding unit capable of holding position information of a plurality of candidates of the object in each of the all image frames;
   a position predicting unit capable of calculating prediction position information of the tracking target in a second image frame based on a motion model determined from a position and a velocity of the tracking target in a first image frame, the first and second image frames being consecutive and picked up from the all image frames
   a candidate extracting unit capable of calculating likelihood scores indicating degrees of coincidence of positions for respective combinations of the position information and the prediction position information of the tracking target in the second image frame, extracting one or two or more candidates in the second image frame based on the likelihood scores, and outputting the position information of the extracted one or two or more candidates to the candidate position holding unit;
   a target position specifying unit capable of specifying position information of the object as the tracking target in the second image frame from the position information of the one or two or more candidates having been extracted by the candidate extracting unit, based on an evaluation score indicating a plausibility as the tracking target obtained from a combination of a position score and a motion score calculated based on the motion model;
   a moving body tracking unit capable of tracking the movement of the object by tracing the position information of the object in the first image frame and the second image frame.

2. The moving body tracking device according to claim 1 wherein the candidate extracting unit sets an upper limit of the number of the candidates of the object in the second image frame calculated from a same candidate in the first image frame used as a basis of calculation of the prediction position information by the position predicting unit.

3. The moving body tracking device according to claim 1 wherein the candidate extracting unit extracts at least one candidate in the second image frame based on each of all candidates in the first image frame.

4. The moving body tracking device according to claim 3 wherein the candidate extracting unit removes a candidate in the second image frame having a likelihood score that is less than a threshold from the candidates.

5. The moving body tracking device according to claim 1 wherein the object as the tracking target includes a ball in a ball game.

6. The moving body tracking device according to claim 2 wherein the object as the tracking target includes a ball in a ball game.

7. The moving body tracking device according to claim 3 wherein the object as the tracking target includes a ball in a ball game.

8. The moving body tracking device according to claim 4 wherein the object as the tracking target includes a ball in a ball game.

9. A moving body tracking method of tracking a movement of an object to be detected by an pattern matching method in a given environment using image data, the method comprising the steps of:
   generating position information of the object in each of all image frames;
   holding position information of a plurality of candidates of the object in each of the all image frames;
   calculating prediction position information of the tracking target, a second image frame based on a motion model determined from a position and a velocity of the tracking target in a first image frame, the first and second image frames being consecutive and picked up from the all image frames;

calculating likelihood scores indicating degrees of coincidence of positions for respective combinations of the position information and the prediction position information of the tracking target in the second image frame, extracting the one or two or more candidates in the second image frame based on the likelihood scores, and outputting the position information of the extracted one or two or more candidates;

specifying position information of the object as the tracking target in the second image frame from the position information of the one or two or more candidates having been extracted, based on an evaluation score indicating a plausibility as the tracking target obtained from a combination of a position score and a motion score calculated based on the motion model; and tracking the movement of the object by tracing the position information of the object in the first image frame and the second image frame.

10. A moving body tracking method of tracking an object detected by a pattern matching method in a given environment using image data, the method comprising the steps of:

determining position information of the object as a tracking target in a first image frame;

detecting a plurality of candidates with each position information in a second image frame consecutive to the first image frame by the pattern matching method wherein the position information is based on a fixed coordinate system specified by the given environment in the first image frame and the second image frame;

calculating prediction position information of the object in the second image frame based on the position information in the first image frame and a law of motion of the object;

calculating a likelihood score by comparing each of the position information of the plurality of candidates and the calculated prediction position information of the object; and extracting at least one candidate from the plurality of candidates based on the likelihood score;

calculating a position score and/or a motion score of each of the at least one candidate extracted from the plurality of candidates;

determining position information of one candidate selected based on the calculated position score and/or motion score.

11. The moving body tracking method according to claim 10 wherein the law of motion comprises a classical mechanics.

12. The moving body tracking method according to claim 10 wherein the position score is based on an existence probability distribution.

13. The moving body tracking method according to claim 12 wherein the existence probability distribution is based on a position condition specified by the given environment.

14. The moving body tracking method according to claim 10 wherein the motion score is based on a velocity of the object specified by the given environment.

15. The moving body tracking method according to claim 10 wherein the steps from the determining position information of the object to the determining position information of one candidate are repeated such that the object is traced by the position information of each image frame.

* * * * *